United States Patent [19]

Denny et al.

[11] 4,246,589

[45] Jan. 20, 1981

[54] INERTIAL DEFLECTION FIELD TILTING FOR BI-DIRECTIONAL PRINTING IN INK JET PRINTERS

[75] Inventors: Clifford M. Denny, Lexington, Ky.; John G. Hughes, Los Angeles, Calif.; Donald L. West, Lexington, Ky.

[73] Assignee: International Business Machines Corporation, Armonk, N.Y.

[21] Appl. No.: 76,040

[22] Filed: Sep. 17, 1979

[51] Int. Cl.[3] .............................................. G01D 15/18

[52] U.S. Cl. .............................................. 346/75; 346/140 R

[58] Field of Search .............................................. 346/75, 140 R

[56] References Cited

U.S. PATENT DOCUMENTS

| | | | |
|---|---|---|---|
| 3,895,386 | 7/1975 | Keur et al. | 346/75 X |
| 3,938,163 | 2/1976 | Fujimoto et al. | 346/75 |
| 4,075,636 | 2/1978 | Galetto et al. | 346/75 |
| 4,138,688 | 2/1979 | Heard et al. | 346/75 |
| 4,167,741 | 9/1979 | Heard et al. | 346/75 |

*Primary Examiner*—George H. Miller, Jr.

*Attorney, Agent, or Firm*—William J. Dick

[57] ABSTRACT

In a continuous type ink jet printer having a conventional charging electrode for charging ink drops in accordance with a signal to be recorded on a record receiving media, a pair of deflection electrodes is mounted in a rocker which pivots on a holder mounted on the carrier. As the carrier is accelerated from the stop condition to print speed, the acceleration of the carrier effects rotation of the rocker about the pivot and thus automatic tilt of the deflection electrodes backward from the direction of carrier movement thereby tilting or inclining the electric field formed between the electrodes to compensate for carrier movement. In the preferred form, a simple magnetic type latch is applied to retain the rocker in one position for printing in a first direction, and to enable quick release and reversal, under inertial control, when the carrier moves in the opposite direction.

15 Claims, 6 Drawing Figures

INERTIAL DEFLECTION FIELD TILTING FOR BI-DIRECTIONAL PRINTING IN INK JET PRINTERS

CROSS REFERENCE TO RELATED APPLICATION

See "Image Inclination Control for Ink Jet Printers", Ser. No. 075,911, of Fathergill et al, filed concurrently herewith.

SUMMARY OF THE INVENTION AND STATE OF THE PRIOR ART

The present invention relates to ink jet printers and more specifically relates to continuous type ink jet printers employing apparatus for controlling the inclination of print images (characters, patterns, etc.) by inertially tilting the deflection field in an ink jet printer.

A typical change amplitude controlled continuous type ink jet printer is the IBM 6640 document printer which employs a single nozzle. In this type of printer, deflection of a charged ink drop in the vertical direction of the dot pattern is accomplished by controlling the charge amplitude on individual ink drops so as to produce differences in the amount of deflection between the ink drops as they pass between a pair of deflection electrodes. Deflection in the horizontal direction, however, is produced by movement of the carrier, the carrier having mounted thereon the nozzle for emitting a stream of ink drops, the charging electrode for charging the ink drops in accordance with the signals to be recorded, and the deflection electrodes.

In the aforementioned document printer, the ink drops are scanned in a vertical direction, in the example instance from their lowest to their highest printing position. When a white space is to be left without any drop thereon, the ink drops are left uncharged or receive a minimal charge and are propelled towards a gutter for recirculation back to the ink supply system. As the raster in the ink jet printing machine progresses from its lowest to its highest deflected printing position, the carrier moves from left to right so that the raster slants in the direction of carrier motion. In the IBM 6640 document printer, the effect is nominally 0.00417 inches (0.106 mm) on a vertical distance of 0.167 inches (4.24 mm), or 1.43°. In the example printer, the slant is eliminated by tilting the deflection plate assembly by 1.43° in the opposite direction.

Of course if it is desired to print from right to left, without slant correction, the slope of the characters being printed would appear at double the magnitude inasmuch as the deflection electrodes are tilted in the wrong direction.

Other approaches may rely on the fact that the charge on a drop is roughly proportional to its height in the raster. Therefore, introduction of a second set of deflection electrodes with a horizontally disposed electric field therebetween may be employed to provide raster tilt. Such a system is described in U.S. Pat. No. 3,938,163. Compared to the primary deflection electrodes, the needed deflection in the horizontal direction is only about 2.5%, the length of the throw from the mid-point of the deflector being about twice as far from the page, and the deflector electrodes can be much closer together since deflection within them is quite small. For example, at a 0.030 inch (0.762 mm) spacing, a 0.010 inch (0.254 mm) length, and a 125 volt supply may be sufficient for a system such as the IBM 6640 document printer, thus making it feasible to electronically switch horizontal deflection voltage during carrier turnaround. However, even the 0.254 mm added to the length of throw (throw is defined as the distance that the drop must travel from the nozzle to the paper) increases the already difficult ink drop merge and scatter problem.

In U.S. Pat. No. 4,167,741 to R. S. Heard and D. W. Phillips, filed on Dec. 23, 1977, and entitled "Raster Slant Control in an Ink Jet Printer", means of varying the ink drop inclination by distortion of the electric field is described. In U.S. Pat. No. 4,138,688 is disclosed a method and apparatus for automatically controlling the inclination of patterns in ink jet printers by monitoring the carrier velocity and automatically feeding back a signal to an electric field distortion created by a voltage difference on the deflection electrodes to control the electric field dependent upon carrier velocity. In U.S. Pat. No. 3,895,386, issued on July 15, 1975 is disclosed the basic principle of offsetting one charge electrode with respect to the other charge electrode to effect an inclination or curving of the electric field formed between the electrodes, or in the alternative of skewing one of the electrodes relative to the second electrode to also effect an inclination of the electric field in order to compensate for the tilt.

In view of the above, it is a principle object of the present invention to provide moveable deflection electrodes in a continuous amplitude control type inke jet printer, which electrode movement is controlled for both forward and reverse printing merely by carrier acceleration.

Other objects and a more complete understanding of the invention may be had by referring to the following specification and claims taken in conjunction with the accompanying drawings.

DRAWING DESCRIPTION

Figure 1:
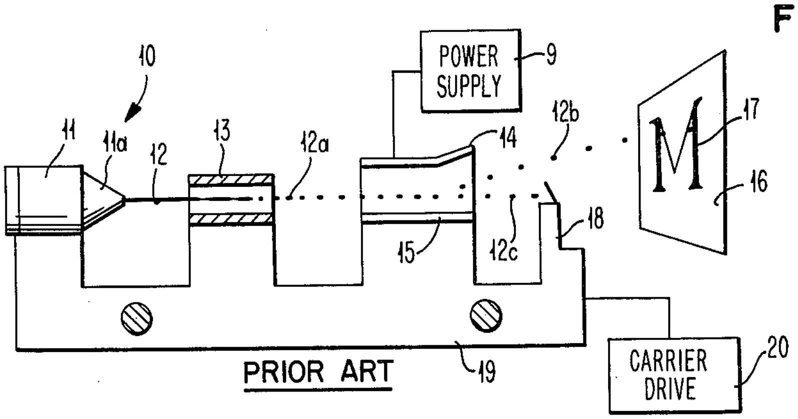
FIG. 1 is a fragmentary schematic view of a typical continuous, charge amplitude controlled type ink jet printer.

Referring now to the drawings, and especially to FIG. 1 thereof, a typical ink jet printer 10 of the charge amplitude or continuous type is illustrated schematically therein. The printer comprises a drop generator or the like 11 to which is supplied ink as from an ink supply .The drop generator is vibrated in a conventional manner as by a piezoelectric crystal which is driven from a crystal driver so that ink is dispelled from a nozzle **11*a*** in a stream 12. The ink stream breaks up within a predetermined distance from the nozzle in a charge electrode or ring 13, the ink drops 12*a* which form from the stream being charged by the charging electrode in accordance with signals representative of images or characters to be printed. Ink drops 12*a* then pass intermediate first and second deflection electrodes 14 and 15 respectively, between which electrodes is an electric field formed by a power supply 9 so that the drops are deflected, for example, along a path 12*b*. The deflected height of the drops is of course dependent upon the amplitude of the charges on the drops. The droplets impinge upon a record receiving means 16 for forming patterns such as images, characters, etc., in the present instance the letter "M" 17 being illustrated on the record receiving means 16. Typically, blank spaces in the amplitude control type ink jet printer are afforded by placing a low charge or no charge on the drops as they are formed within the charging electrode 13, these drops passing between the deflection plates 14 and 15 along path 12*c* where they impinge upon a gutter or the like 18 which allows ink to be recirculated back through an ink supply system (not shown) to the drop generator 11.

The drop generator including the nozzle 11*a* as well as the charging electrode 13, deflection electrodes 14 and 15 and gutter 18 are mounted on a carrier 19 which is driven as by carrier drive means 20 to effect horizontal movement of the ink drop stream relative to the record receiving means 16, in the instance of FIG. 1 the carrier moves into and out of the plane of the drawing.

Figure 2:
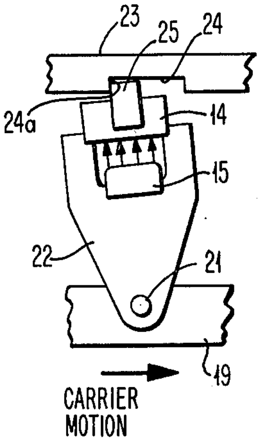
FIGS. 2 and 3 are fragmentary schematic views illustrating apparatus constructed in accordance with the present invention and showing the apparatus in a first position for a first direction of carrier motion and a second position for a second direction of carrier motion.
Figure 3:
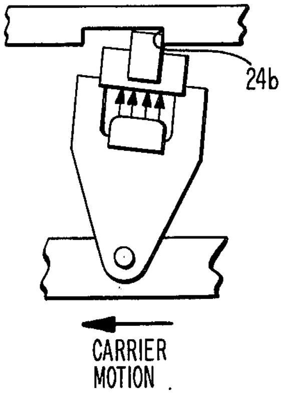

In accordance with the invention, means are provided for effecting deflection field tilting by inertia to permit of bi-directional printing in an ink jet printer. To this end and referring first to FIGS. 2 and 3, the upper and lower deflection electrodes 14 and 15 respectively are mounted in spaced apart relation on a rocker member or yoke 22, the rocker member or yoke 22 being pivoted as at 21 to the carrier 19 along an axis transverse to the carrier motion. In order that the rotation of the rocker member 22 is limited, stop means operative in conjunction with the rocker member is provided. To this end, mounted on the carrier is a bridge frame structure 23 including a recessed portion 24 which limits the rocker member or yoke 22 rotation between a first position such as shown in FIG. 2 and a second position which is shown in FIG. 3. This is accomplished by a resilient bumper means or insulator 25 (preferably energy absorbing rubber) mounted on the upper deflection electrode 14 which registers with the recess 24 in such a manner that the left edge 24*a* of the recess 24 registers with the bumper 25 when the carrier 19 motion is to the right such as illustrated in FIG. 2, and with the righthand edge 24*b* of the recess 24 when the carrier motion is to the left such as illustrated in FIG. 3. (For purposes of this specification and claims, "acceleration" includes both positive and negative [sometimes called deceleration] acceleration).

Although the electric or electrostatic field may be tilted as described above, it is desirable to maintain the predetermined position of the electric field during a print cycle (the printing of a single line of print in one direction), for example such as illustrated in FIG. 2 when the carrier is moving from left to right the print cycle is from left to right, while in the instance of FIG. 3, the print cycle is from right to left. The desireability of providing rocker position maintenance is that besides the primary acceleration forces which occur at reversal of carrier direction, or upon starting the carrier from a rest position, other secondary forces act on the tilting mechanism such as a bouncing of the bumper upon the stop afforded by the recess 24 or some disturbance in the acceleration forces while the velocity of the carrier is stabilizing.

Figure 4:
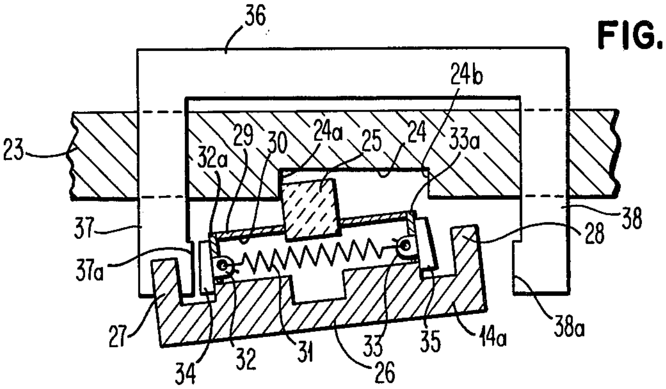
FIG. 4 is an enlarged fragmentary sectional view of a portion of the apparatus illustrated in FIGS. 2 and 3 and illustrating in greater detail a feature of the present invention in which the deflection electrodes have just tilted to the left for commencement of carrier motion such as illustrated in FIG. 2.
Figure 5:
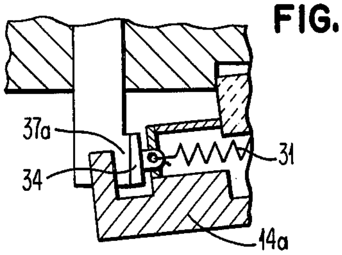
FIG. 5 is a fragmentary sectional schematic view of a portion of the apparatus illustrated in FIG. 4 just after motion has commenced to the right or in the direction of carrier motion illustrated in FIG. 2.
Figure 6:
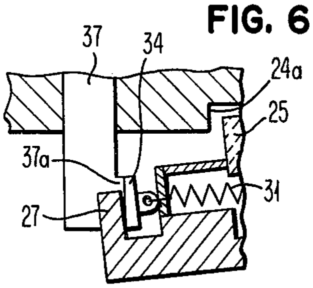
FIG. 6 is a view similar to FIG. 5 illustrating the position of the apparatus of FIG. 4 as the carrier decelerates for motion in the reverse direction.

In order to maintain the position of the rocker member or yoke 22 and thus the position of the electric or electrostatic field intermediate the upper and lower deflection plates 14 and 15 respectively during a print cycle, means are provided for latching the rocker member or yoke 22 which can discriminate between the primary acceleration forces and the secondary forces which may occur such as the bouncing of the bumper or some other disturbance in acceleration forces. While overcenter spring latches or detents may be employed in this connection, in the preferred embodiment of this feature of the invention, a magnet spring combination such as illustrated in FIGS. 4, 5 and 6 is to be preferred. Referring now to FIG. 4, the upper deflection electrode 14*a* may be preferably formed of a plate portion 26, terminal upstanding end portions 27 and 28 which serve, as will be more fully described hereinafter, as knockoff projections, and a sleeve like portion 29 defining a hollow core 30 therein. The bumper 25 may be connected to the central portion of the sleeve member 29 and serves as described heretofor, in conjunction with the recess 24, to limit the motion of the rocker member or yoke 22 between the first position such as illustrated in FIG. 2 and the second position illustrated in FIG. 3. Within the sleeve member 29 is located a tension spring 31 which is connected at its opposite ends to first and second plungers 32 and 33 respectively, the plungers passing through guide rings 32*a* and 33*a* and terminating in pole catchers or shoe members 34 and 35 respectively which are biased by the spring 31 into contact with the ends of the sleeve 29 or the guide rings 32*a* and 33*a*. A horseshoe like magnet 36 including depending first and second pole pieces 37 and 38 has terminal ends 37*a*, 38*a* adapted to register respectively with the shoes 34 and 35 depending upon whether the rocker member or yoke 22 is in its first or second position.

The position of the various elements described above and shown in FIG. 4 is such that the carrier has just moved from right to left and has come to a stop, the deceleration or negative acceleration causing the rocker member or yoke 22 to move counterclockwise about the pivot 21 effecting engagement of the bumper 25 against the lefthand edge 24*a* of the recess 24. Alternatively, if the machine has been at rest, the position illustrated in FIG. 4 would occur immediately after startup of the carrier 19 in the direction of the carrier motion illustrated in FIG. 2.

Because of the proximity of the terminal end 37*a* of the magnet 36 to the pole catcher or shoe 34, an attraction occurs which causes the apparatus, immediately after startup of the carrier 19 in the direction shown in the arrow illustrated in FIG. 2, to engage the magnet and be held thereby under spring 31 tension. The position of the rocker member or yoke 22 and thus the electric field intermediate the deflection electrodes thus will remain as illustrated in FIG. 2 until carrier motion is reversed. Upon reversal of motion the yoke member 22 associated with the deflection electrodes 14 and 15 will tend to continue and cause clockwise rotation about the pivot 21 causing the bumper 25 to move away from its lefthand restraint or stop 24*a*. Because the shoe 35 is stopped by the guide ring 33*a* in the terminal end of the sleeve 29, the spring 31 tends to apply increased tension upon the lefthand shoe 34 held by the terminal end 37*a* of pole piece 37. Moreover, the upstanding terminal end 27 (and 28) of the upper deflection electrode 14*a* is positioned with respect to the shoe 34 to effect and interference fit so that it engages the shoe 34 such as illustrated in FIG. 6 acting as a knockoff projection for the shoe 34 causing the shoe 34 to be removed from the terminal end 37*a*.

In a like manner, when the carrier accelerates in the reverse direction, the pole catcher or shoe 35 contacts the pole piece terminal end 38*a*, the bumper 25 residing against the righthand edge 24*b* such as illustrated in FIG. 3. Knockoff of the shoe 35 occurs, in a like manner, due to the knockoff projection or upstanding terminal end portion 28 of the upper deflection electrode 14*a* upon reverse motion occurring to the carrier motion illustrated in FIG. 3.

Thus the present invention provides an inertial direction field tilting mechanism to permit bi-directional printing in ink jet printers while correcting automatically for the character tilt which occurs due to the interaction of scan of the ink drops and carrier motion.

Although the invention has been described with a certain degree of particularity it is understood that the present disclosure has been made only by way of example and that numerous changes in the details of construction, the combination and arrangement of parts, and the method of operation may be made without departing from the spirit and scope of the invention as hereinafter claimed.

What is claimed is:

1. An ink jet printer comprising:
- a nozzle for emitting a stream of ink drops along a predetermined path;
- a charging electrode for charging the ink drops in accordance with a signal to be recorded;
- a pair of deflection electrodes, and means for forming an electric field therebetween for deflecting ink drops passing between said electrodes in accordance with the amplitudes of the individual charges on the ink drops;
- a record receiving means for forming images indicative of the signals on said deflected ink drops;
- carrier means mounting said nozzle, charging electrode and deflection electrodes, and drive means for effecting movement of said carrier relative to said record receiving means resulting, if uncompensated for, an inclination of said images formed by said ink drops;
- and rocker means mounting said deflection electrodes in spaced apart relation, said rocker means mounted for rotation on said carrier, stop means operative in conjunction with said rocker means for limiting the rotation of said rocker means between a first position, inclining said electric field in a first direction for relative movement between said carrier and record receiving media in a first direction, and a second position for relative movement in the opposite direction;
- said rocker means being dependent for its position upon the acceleration of said carrier by said drive means.

2. An ink jet printer in accordance with claim 1 including latch means for inhibiting rotation of said rocker means until a predetermined force is achieved by said acceleration of said carrier.

3. An ink jet printer in accordance with claim 2 wherein said rocker means comprises a yoke, and pivot means connecting said yoke to said carrier; said stop means comprising;
- a bumper means mounted on said yoke, and means mounted on said carrier for registration with said bumper means at said first and second positions to limit said rotation of said yoke.

4. A ink jet printer in accordance with claim 3 wherein said latch means comprises a magnet, and pole catchers connected to said yoke for engagement with said magnet, biasing means interconnecting said pole catchers, and means on said yoke for disengaging said pole catchers from said magnet when forces due to acceleration reaches a predetermined level.

5. A ink jet printer in accordance with claim 4 wherein said means on said yoke for disengaging said pole catchers from said magnets comprises an upstanding knock-off projection which forms an interference fit with said pole catchers whereby, upon commencement of rotation of said rocker member, said projection engages said pole catchers effecting said disengagement.

6. An ink jet printer in accordance with claim 5 wherein said pole catchers comprise shoes, and sleeve means on said yoke mounting said shoes at opposite ends of said sleeve means.

7. An ink jet printer in accordance with claim 6 wherein said biasing means comprises a spring interconnecting said shoes.

8. In an ink jet printer comprising a nozzle for emitting a stream of ink drops along a predetermined path; a charging electrode for charging the ink drops in accordance with the signals to be recorded; a pair of deflection electrodes and means for forming an electric field therebetween for deflecting ink drops passing between said electrodes in accordance with the amplitude of the individual charges on the ink drops; a record receiving means for forming images indicative of the signals on said deflected ink drops;
- carrier means mounting said nozzle, charging and deflection electrodes, said drive means for effecting relative movement between said record receiving means and said carrier resulting, if uncompensated for, an inclination of said images formed by said ink drops;
- the improvement comprising a rocker member mounting said deflection electrodes in spaced apart relation, said rocker member pivotally coupled to said carrier for rotation about an axis transverse to the direction of relative movement;
- stop means operative in conjunction with said rocker means for limiting the rotation of said rocker means between a first position, inclining said electric field in a first direction for relative movement between said carrier and said record receiving media in a first direction, and a second position for relative movement in the opposite direction;
- said rocker means being operable between said first and second positions and dependent for its position upon the acceleration of relative movement effected by said drive means.

9. In an ink jet printer in accordance with claim 8 including latch means for inhibiting rotation of said rocker member until a predetermined force is achieved by said acceleration.

10. In an ink jet printer in accordance with claim 9 wherein said rocker means comprises a yoke member;

said stop means comprising a bumper means mounted on said yoke member, and means mounted on said carrier for registration with said bumper means at said first and second positions to limit said rotation of said yoke member.

11. In an ink jet printer in accordance with claim 9 wherein said rocker member comprises a yoke member, said latch means comprises a magnet mounted on one of said carrier and yoke members, and pole catchers connected to the other of said carrier and yoke member for engagement with said magnet, and means for disengaging said pole catchers from said magnet when forces due to acceleration reach a predetermined level.

12. In an ink jet printer in accordance with claim 11 including biasing means interconnecting said pole catchers.

13. In an ink jet printer in accordance with claim 11 wherein said means on said yoke for disengaging said pole catchers from said magnets comprises an upstanding knock-off projection which forms an interference fit with said pole catchers whereby, upon commencement of rotation of said yoke member, said projection engages said pole catchers effecting said disengagement.

14. In an ink jet printer in accordance with claim 13 wherein said pole catchers comprise shoes, and sleeve means on said yoke member mounting said shoes at opposite ends of said sleeve means.

15. In an ink jet printer in accordance with claim 14 including biasing means interconnecting said shoes, said biasing means comprising a spring.

* * * * *